(12) United States Patent
Schmitt et al.

(10) Patent No.: US 10,480,659 B2
(45) Date of Patent: Nov. 19, 2019

(54) COUPLING DEVICE FOR THE ROTARY COUPLING OF A PIVOT SHAFT OF A FLAP DIAPHRAGM OF AN EXHAUST GAS FLAP WITH A DRIVE ELEMENT

(71) Applicant: Eberspächer Exhaust Technology GmbH & Co. KG, Neunkirchen (DE)

(72) Inventors: Steffen Schmitt, Ostfildern (DE); Stefanos Varelis, Leinfelden (DE); Markus Birgler, Wernau (DE); Georg Wirth, Kirchheim u. Teck (DE)

(73) Assignee: Eberspächer Exhaust Technology GmbH & Co. KG, Neunkirchen (DE)

(*) Notice: Subject to any disclaimer, the term of this patent is extended or adjusted under 35 U.S.C. 154(b) by 150 days.

(21) Appl. No.: 15/634,140

(22) Filed: Jun. 27, 2017

(65) Prior Publication Data

US 2018/0128381 A1 May 10, 2018

(30) Foreign Application Priority Data

Jun. 28, 2016 (DE) .................. 10 2016 111 762
Aug. 9, 2016 (DE) .................. 10 2016 114 703

(51) Int. Cl.
*F16K 1/22* (2006.01)
*F16K 1/48* (2006.01)
(Continued)

(52) U.S. Cl.
CPC ............. *F16K 1/221* (2013.01); *F02D 9/04* (2013.01); *F02D 9/06* (2013.01); *F16D 3/14* (2013.01); *F16D 3/50* (2013.01); *F16K 1/48* (2013.01); *F16K 31/041* (2013.01); *F16K 31/043* (2013.01); *F02D 9/1065* (2013.01)

(58) Field of Classification Search
CPC .......... F16K 1/221; F16K 1/48; F16K 31/041; F16K 31/043; F02D 9/1065; F16D 3/14; F16D 3/50; F16D 3/72
See application file for complete search history.

(56) References Cited

U.S. PATENT DOCUMENTS 2,724,251 A * 11/1955 Weaver ................... F16D 3/72
411/918
4,566,424 A    1/1986 Billingsley et al.
(Continued)

FOREIGN PATENT DOCUMENTS

DE         40 28 931 A1    3/1992
DE   10 2009 013 815 A1    9/2010
(Continued)

*Primary Examiner* — Audrey K Bradley
(74) *Attorney, Agent, or Firm* — McGlew and Tuttle, P.C.

(57) ABSTRACT

A coupling device, for the rotary coupling of a pivot shaft of a flap diaphragm of an exhaust gas flap with a drive element, includes at least one coupling element (36) with a first coupling area (40) configured for coupling to the pivot shaft (18), with a second coupling area (42) configured for coupling to the drive element (34) and with at least one connection area (52, 58) connecting the first coupling area (40) to the second coupling area (42). In the coupled state, the first coupling area (40) and the second coupling area (42) are prestressed in a direction towards one another or in a direction away from one another. The at least one coupling element (36) is formed with sheet material.

19 Claims, 6 Drawing Sheets

(51) Int. Cl.
*F02D 9/10* (2006.01)
*F16D 3/14* (2006.01)
*F16D 3/50* (2006.01)
*F16K 31/04* (2006.01)
*F02D 9/04* (2006.01)
*F02D 9/06* (2006.01)

(56) References Cited

U.S. PATENT DOCUMENTS

| | | | |
|---|---|---|---|
| 5,271,269 A | | 12/1993 | Rilling et al. |
| 5,531,205 A | * | 7/1996 | Cook .................... F02D 9/101 |
| | | | 123/568.24 |
| 6,598,619 B2 | | 7/2003 | Gagnon |
| 2003/0056836 A1 | | 3/2003 | Gagnon |

FOREIGN PATENT DOCUMENTS

| | | | | |
|---|---|---|---|---|
| DE | 102009013815 A1 | * | 9/2010 | .............. F02D 9/04 |
| DE | 10 2014 017 523 A1 | | 6/2015 | |
| DE | 10 2014 113 332 B3 | | 11/2015 | |
| DE | 102014113332 B3 | * | 11/2015 | .............. F02D 9/04 |
| DE | 10 2015 202 211 A1 | | 8/2016 | |
| EP | 1 887 200 A1 | | 2/2008 | |

\* cited by examiner

COUPLING DEVICE FOR THE ROTARY COUPLING OF A PIVOT SHAFT OF A FLAP DIAPHRAGM OF AN EXHAUST GAS FLAP WITH A DRIVE ELEMENT

CROSS REFERENCE TO RELATED APPLICATIONS

This application claims the benefit of priority under 35 U.S.C. § 119 of German Applications DE 10 2016 111 762.5, filed Jun. 28, 2016, and DE 10 2016 114 703.6, filed Aug. 9, 2016, the entire contents of which are incorporated herein by reference.

FIELD OF THE INVENTION

The present invention pertains to a coupling device for the rotary coupling of a pivot shaft of a flap diaphragm of an exhaust gas flap with a drive element, comprising at least one coupling element with a first coupling area configured for coupling to the pivot shaft, with a second coupling area configured for coupling to the drive element and with at least one connection area connecting the first coupling area to the second coupling area, wherein, in the coupled state, the first coupling area and the second coupling area are prestressed (force biased) in a direction towards one another or in a direction away from one another.

BACKGROUND OF THE INVENTION

Such a coupling device is known from DE 10 2009 013 815 A1. A coupling device having a C-shaped coupling element formed from wire material or the like is provided for coupling a drive shaft of a flap drive with a pivot shaft of a flap diaphragm of an exhaust gas flap. In its coupling areas provided by respective C legs, the coupling element meshes with associated recesses of the drive shaft, on the one hand, and of the pivot shaft, on the other hand, and thus establishes a rotary coupling between these two components. The two C legs are, in the coupled state, prestressed in a direction away from one another and thus load the pivot shaft of the flap diaphragm in a direction away from the drive shaft or the flap drive.

U.S. Pat. No. 6,598,619 B2 discloses an exhaust gas flap with a drive element configured in the form of a drive shaft and with a pivot shaft arranged coaxially thereto. A coupling device coupling the drive shaft with the pivot shaft for joint rotary motion comprises a coupling element having a box-like configuration.

SUMMARY OF THE INVENTION

An object of the present invention is to provide a coupling device for the rotary coupling of a pivot shaft of a flap diaphragm of an exhaust gas flap with a drive element, which coupling device has an increased torsional strength in connection with good thermal uncoupling of the pivot shaft from the drive element.

According to the present invention, this object is accomplished by a coupling device for the rotary coupling of a pivot shaft of a flap diaphragm of an exhaust gas flap with a drive element, comprising at least one coupling element with a first coupling area configured for coupling to the pivot shaft, with a second coupling area configured for coupling to the drive element and with at least one connection area connecting the first coupling area to the second coupling area, wherein, in the coupled state, the first coupling area and the second coupling area are prestressed (force biased) in a direction towards one another or in a direction away from one another.

Furthermore, provisions are made here for the at least one coupling element to be formed with sheet material.

By configuring the at least one coupling element with sheet material, it is achieved that in case of a comparatively small heat conduction cross section and large surface for the dissipation of heat to the environment, this component provides an increased torsional strength and thus an improved rotary coupling of the drive element with the pivot shaft. At the same time, the coupling element made of sheet material can, like a leaf spring, generate the prestressing action that is generally advantageous for prestressing the pivot shaft.

It should be pointed out that in the sense of the present invention, sheet material refers to a material, which, when viewed in cross section, has a markedly greater extension in one direction, generally a width direction, than in a direction at right angles thereto, generally a thickness direction. For example, the extension in the width direction may correspond to at least five times or ten times the extension of the thickness direction. Such material may generally also be called strip material.

In order to obtain the desired torsional strength, on the one hand, and to be able to also provide the desired prestressing action, on the other hand, it is proposed that the at least one coupling element be formed with sheet metal material, preferably steel sheet or titanium sheet.

In one embodiment, which is especially advantageous because of the simple configuration and stable coupling action, provisions may be made for one, i.e., a single coupling element to be provided and for a first connection area to be provided adjacent to a first end area of the first coupling area and a first end area of the second coupling area and for a second connection area to be provided adjacent to a second end area of the first coupling area and a second end area of the second coupling area.

This single coupling element is preferably formed from one, i.e., a single piece of sheet material and a coupling area of the first coupling area and the second coupling area comprises here end areas of the piece of sheet material, which are arranged overlapping one another or connected to one another by a connecting part.

In an alternative embodiment variant, two coupling elements may be provided, wherein these two coupling elements may be arranged such that the first coupling area comprises a first end area of one of the two coupling elements and a first end area of the other of the two coupling elements and the second coupling area comprises a second end area of one of the two coupling elements and a second end area of the other of the two coupling elements.

In order to be able to guarantee a stable coupling of the two coupling elements both to the drive element and to the pivot shaft in the two coupling areas, it is proposed that the two first end areas of the two coupling elements be arranged overlapping one another or be connected to one another by a connecting part and the two second end areas of the two coupling elements be arranged overlapping one another or be connected to one another by a connecting part.

Each of the two coupling elements may be formed from a piece of sheet material.

In one embodiment variant, intrinsically guaranteeing a high stability of the coupling elements and also permitting the necessary axial elasticity, on the other hand, provisions may be made for at least one connection area to have a V-shaped configuration.

Provisions may be made for at least one connection area to have an a-shaped configuration in order to avoid local overloads in the connection areas.

In another alternative embodiment, provisions may be made for at least one connection area to have a U-shaped configuration. This avoids local overloads introduced by sharply bent or curved areas as well.

The present invention further pertains to an exhaust gas flap, especially for the exhaust gas stream of an internal combustion engine, comprising a flap tube, a flap diaphragm carried in the interior of the flap tube on a pivot shaft rotatable about a pivot axis as well as a pivot drive for the pivot shaft with a drive element, and further comprising a coupling device having the configuration according to the present invention coupling the drive element with the pivot shaft for joint rotation about the pivot axis.

By using the coupling device configured according to the present invention, a stable and defined coupling of the drive element with the pivot shaft is guaranteed, on the one hand. The prestressing generated by the coupling device makes possible a defined positioning of the pivot shaft and thus of the flap diaphragm in the flap tube receiving same, on the other hand.

For the nonrotatable coupling of the coupling device with the drive element or the pivot shaft, it is proposed that a first opposite positive-locking coupling formation be provided at the pivot shaft and a first positive-locking coupling formation meshing in a coupling manner with the first opposite positive-locking coupling formation be provided at the first coupling area of the coupling device, and that a second opposite positive-locking coupling formation be provided at the drive element and a second positive-locking coupling formation meshing in a coupling manner with the second opposite positive-locking coupling formation be provided at the second coupling area of the coupling device. In particular, provisions may be made for at least one positive-locking coupling formation or opposite positive-locking coupling formation to have a polygonal outer profile and for the opposite positive-locking coupling formation or positive-locking coupling formation associated with same to have a complementary polygonal inner profile.

In order to be able to guarantee a defined positioning of the pivot shaft and thus of the flap diaphragm carried on it by means of the coupling device, it is proposed that the first coupling area be prestressed in a direction towards the pivot shaft and the second coupling area be prestressed in a direction towards the drive element, preferably such that the pivot shaft is prestressed by the coupling device in a direction away from the drive element.

According to the present invention, the above-mentioned prestressing of the two coupling areas each in a direction towards the assembly unit, pivot shaft or drive element, to be coupled with same for joint rotation can further be used to generate a stable coupling between a respective coupling area and the assembly unit to be coupled with it. To this end, it is proposed that the first opposite positive-locking coupling formation be configured as tapering in a direction towards the drive element, or/and that the second opposite positive-locking coupling formation be configured as tapering in a direction towards the pivot shaft.

The present invention is described in detail below with reference to the attached figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
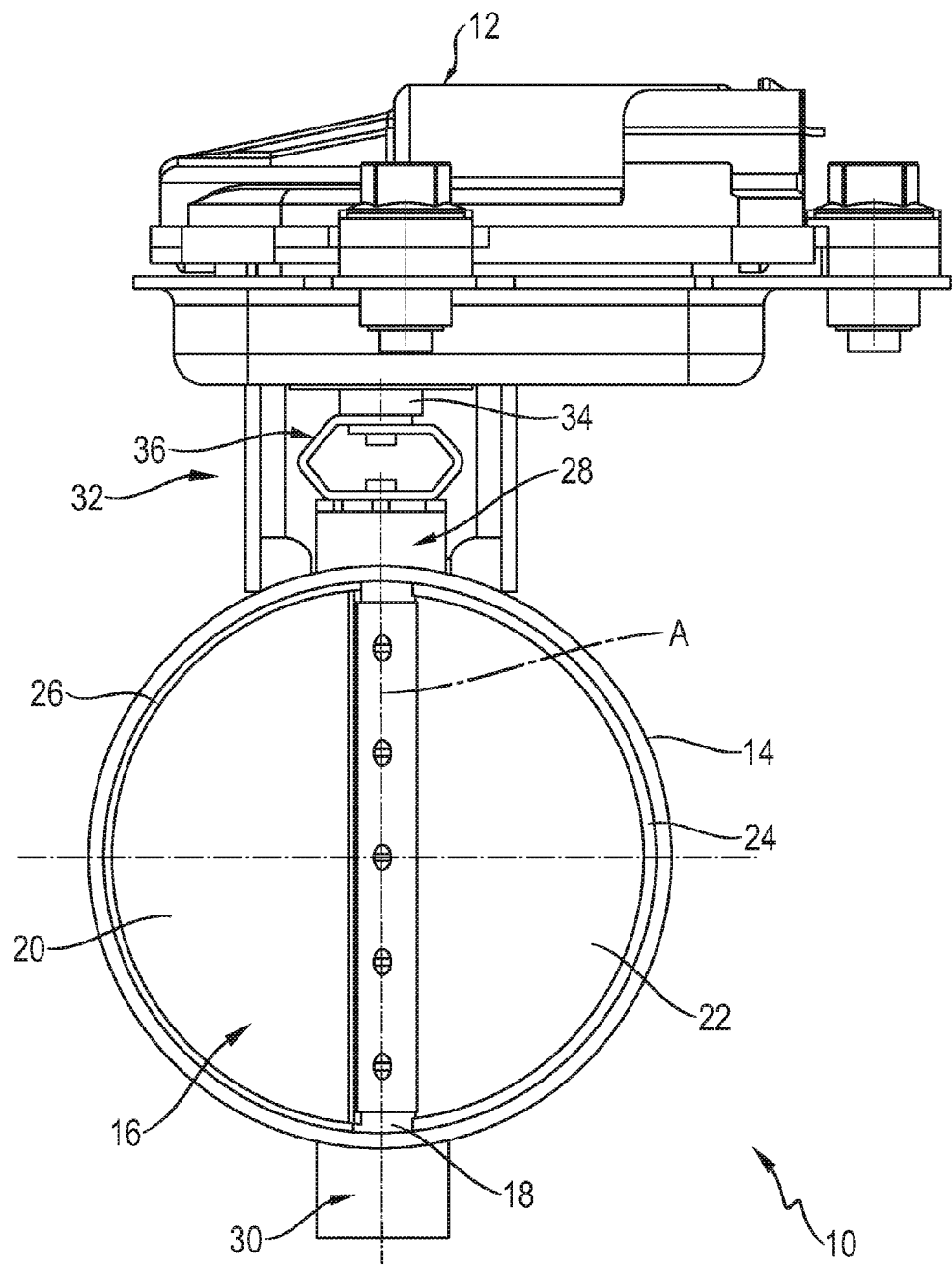
FIG. 1 is a lateral view of an exhaust gas flap with an associated flap drive.

Referring to the drawings, FIG. 1 shows in a lateral view an exhaust gas flap, which is generally designated by 10 and can be used, for example, in an exhaust system of an internal combustion engine, with a flap drive 12 associated with same. The exhaust gas flap 10 comprises a flap tube 14, in which a flap diaphragm, which is generally designated by 16, is carried pivotably about a pivot axis A on a pivot shaft 18. The flap diaphragm 16 comprises two flap wings 20, 22, which are in contact with wing stops 24, 26 provided on the inner circumference of the flap tube 14 when the flap diaphragm 16 is positioned in a blocked position.

The pivot shaft 18 is carried rotatably or pivotably about the pivot axis A at its two axial end areas 28, 30 in relation to the flap tube 14 by means of corresponding bearing arrangements. In a first axial end area 28 of the pivot shaft 18, the pivot shaft 18 is coupled with a drive element 34 of the flap drive 12, for example, a drive shaft, for joint rotation by means of a coupling device 32 described below. In this area, the pivot shaft 18 can be coupled to the coupling device 32 directly or via a component nonrotatable with the pivot shaft 18.

Figure 2:
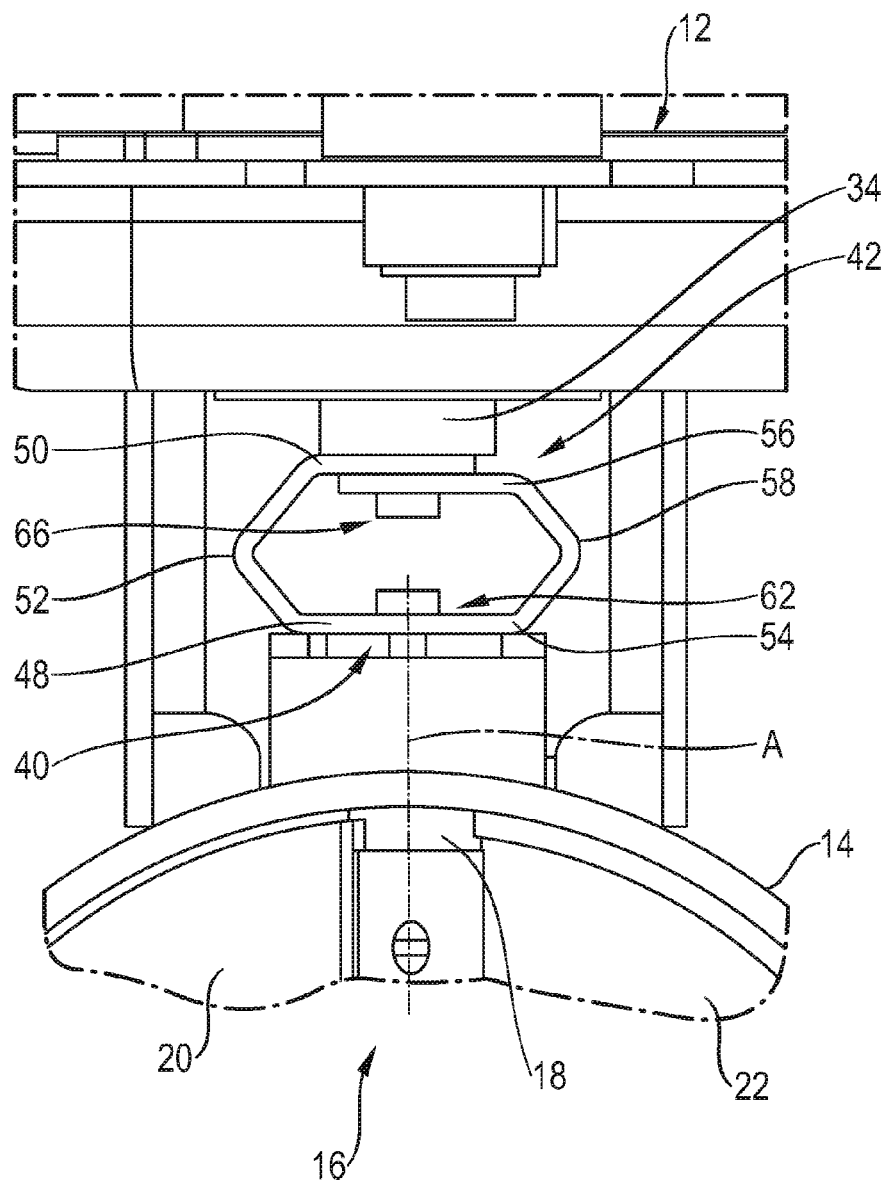
FIG. 2 is an enlarged view of the area of the coupling of the flap drive with a pivot shaft.
Figure 3:
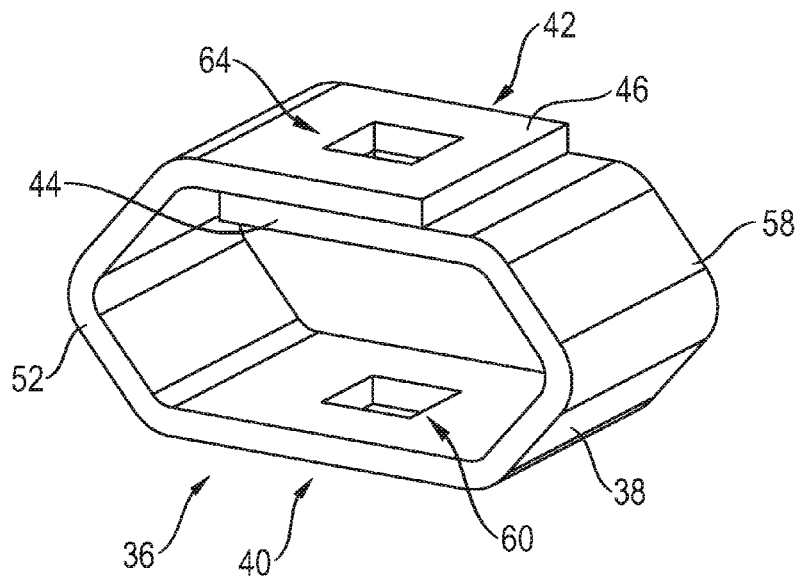
FIG. 3 is a perspective view showing a coupling device.

This area of the coupling of the pivot shaft 18 with the drive element 34 and the coupling device 32 used for the coupling are shown in detail in FIGS. 2 and 3, respectively.

The coupling device 32 comprises a coupling element 36 made of sheet material in the exemplary embodiment shown in FIGS. 1 through 3. The coupling element 36 is made of a single piece of sheet material 38, which can be provided, for example, by separating from a sheet-shaped raw material and can then be bent into the configuration shown in FIG. 3. The piece of sheet material 38 or the coupling element 36 made with it is preferably made of sheet metal material, e.g., steel sheet, especially spring steel sheet, preferably stainless steel, or titanium sheet. The piece of sheet material 38, which is first provided in a planar configuration, is bent into the configuration which can be seen in FIG. 3, in which a first coupling area 40 configured for coupling with the pivot shaft 18 and a second coupling area 42 configured for coupling with the drive element 34 are, e.g., essentially facing one another parallel with respective flat sides. The piece of sheet material 38 bent into this configuration essentially forms an essentially self-contained, ring-like structure. To this end, the two end areas 44, 46 of the piece of sheet material 38 are arranged overlapping one another in the second coupling area 42 or providing the second coupling area 42. These overlapping end areas 44, 46 can be connected to one another, for example, by connection in substance, especially welding, but may also be positioned loosely overlapping one another.

At a first end area 48 of the first coupling area 40 or at a first end area 50 of the second coupling area 42, a first connection area 52 having a V-shaped configuration in this exemplary embodiment is connected to the two coupling areas 40, 42. In a second end area 54 of the first coupling area 40 and in a second end area 56 of the second coupling area 42, a second connection area 58 likewise having a V-shaped configuration is connected to the two coupling areas 40, 42. Because of the configuration of the single coupling element 36 from a single piece of sheet material 38, the two connection areas 52, 58 form an integral structure with the coupling areas 40, 42 connected by these connection areas.

The coupling element 36 has a first positive-locking coupling formation 60 in its first coupling area 40 for the nonrotatable coupling to the pivot shaft 18, on the one hand, and to the drive element 34, on the other hand. Corresponding to this, the pivot shaft 18 has a first opposite positive-locking coupling formation 62 at its first axial end area 28. In the second coupling area 42, the coupling element 36 has a second positive-locking coupling formation 64. Corresponding to this, the drive element 34 has a second opposite positive-locking coupling formation 66. In the example shown, the two positive-locking coupling formations 60, 64 are provided as polygonal inner profiles formed in the two coupling areas 40, 42, here with an essentially rectangular or square structure. The two opposite positive-locking coupling formations 62, 66 are, corresponding to this, configured as polygonal outer profiles, which can be fitted essentially without play into the polygonal inner profiles of the positive-locking coupling formations 60, 64 and thus guarantee a rotary coupling essentially without play of the pivot shaft 18 with the drive element 34.

It should be pointed out here that other formations guaranteeing a holding together acting in a positive-locking manner in the direction of rotation may also be used.

Due to the configuration of the coupling device 32 with the single coupling element 36, in which the two coupling areas 40, 42 are connected to one another by means of the connection areas 52, 58 on both sides of the pivot axis A, an intrinsically torsion-proof device, which guarantees a defined rotary coupling of the pivot shaft 18 with the drive element 34 and thus makes possible an accurate adjustability of the pivot position of the flap diaphragm 16 in the flap tube 14, is also obtained because of the configuration of the coupling element 36 from sheet material. At the same time, the coupling element 36 made of the piece of sheet material 38 has a high temperature lag because of the comparatively small cross-sectional area, wherein, because of the flat or strip-like configuration of the coupling element 36, this coupling element has at the same time a large surface in order to thus be able to efficiently dissipate heat taken up from the area of the exhaust gas flap 10 to the environment and to prevent the introduction of heat into the flap drive 12 as far as possible.

Since, furthermore, the coupling element 36 or the piece of sheet material 38 used for the formation thereof is made of sheet metal material, e.g., steel sheet or titanium sheet, which can provide a springy property, it becomes possible to configure the coupling element 36 or to insert the coupling element 36 between the drive element 34 and the pivot shaft 18 such that the two coupling areas 40, 42, in the installed state, are prestressed in a direction away from one another, i.e., the first coupling area 40 is prestressed in a direction towards the pivot shaft 18 and the second coupling area 42 is prestressed in a direction towards the drive element 34. Thus, the pivot shaft 18 is loaded by the first coupling area 40 in a direction away from the flap drive 12 due to the coupling element 36 supporting the second coupling area 42 at the drive element 34 or at the flap drive 12. In spite of the generally unavoidable bearing play of the bearing supporting the pivot shaft 18 relative to the flap tube 14, this guarantees a defined positioning of the pivot shaft 18 and thus also of the flap diaphragm 16 carried on it in the interior of the flap tube 14. Further, because of the two connection areas 52, 58, a symmetrical loading of the pivot shaft 18 or of the bearing supporting same is achieved, as a result of which the bearing friction can be reduced.

Figure 4:
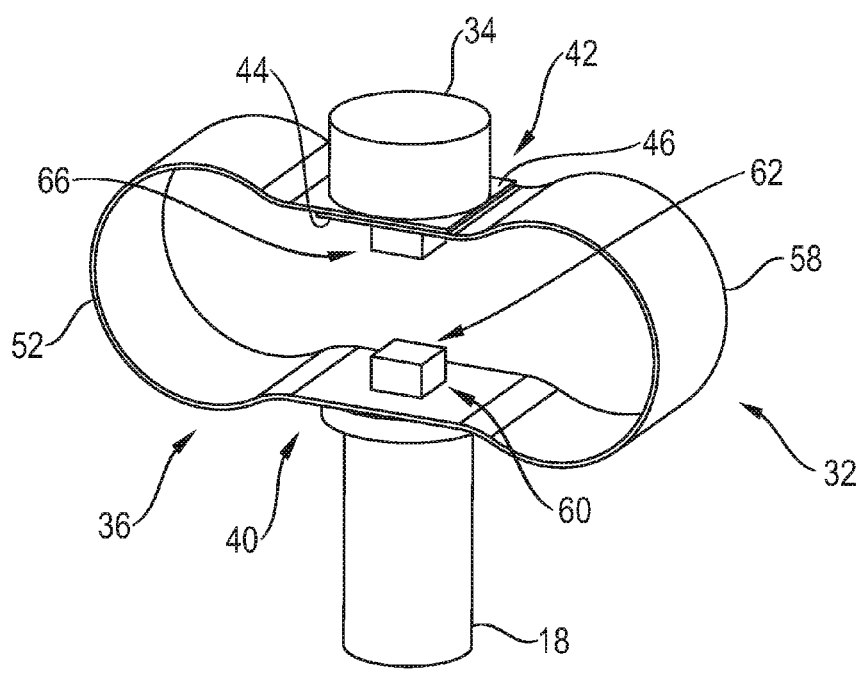
FIG. 4 is a perspective view showing an alternative type of embodiment of a coupling device between a drive element and a pivot shaft.
Figure 5:
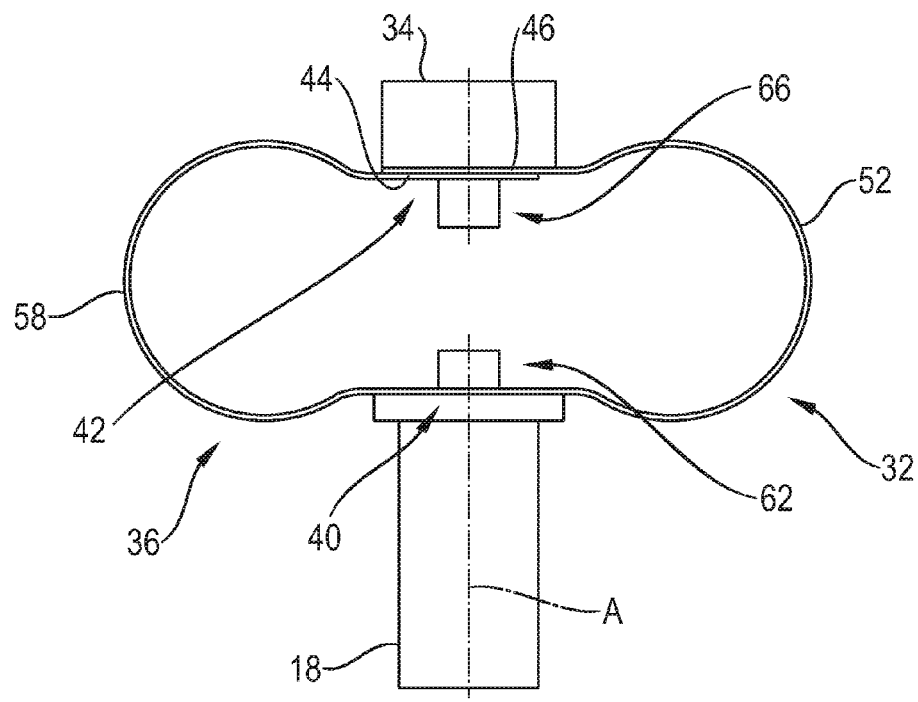
FIG. 5 is a lateral view showing the coupling device of FIG. 4.
Figure 6:
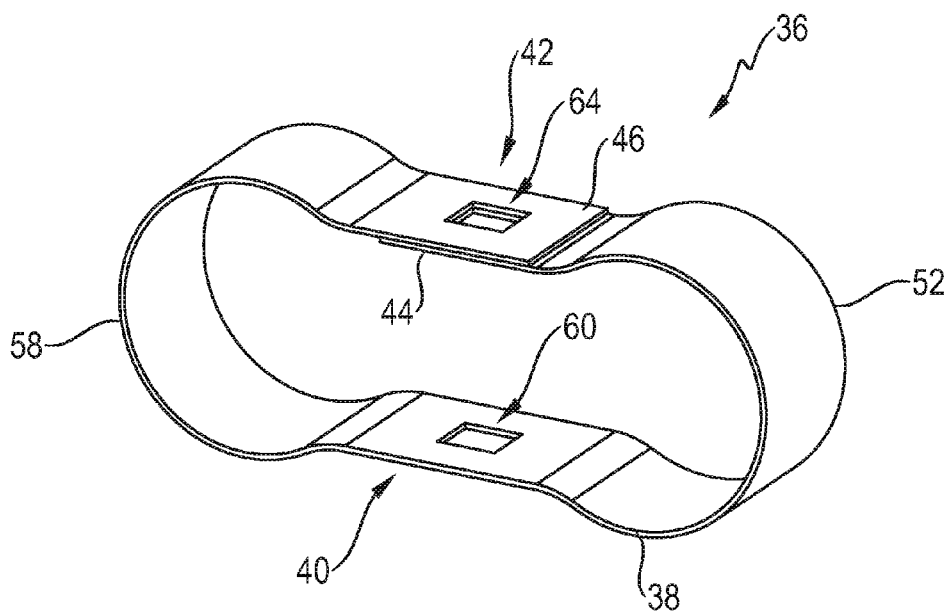
FIG. 6 is a perspective view showing the coupling device of FIG. 4.

A modified embodiment of the coupling element 36 is shown in FIGS. 4 through 6. While the coupling element 32 shown in FIGS. 4 through 6 essentially corresponds to the above-described coupling element 32 of the embodiment of FIGS. 1 through 3 with regard to the configuration of the two coupling areas 40, 42, it can be seen that the connection areas 52, 58, starting from the two coupling areas 40, 42, which are arranged essentially parallel opposite one another, provide an at first expanding structure of the coupling element 36, i.e., generally an Ω-shaped structure, so that the entire coupling element 36 has a bone-like structure. In this case, unlike in the above-described embodiment, the two connection areas 52, 58 are essentially provided with an essentially circular structure essentially without bend-like deformation areas, so that the occurrence of load peaks and thus a local overloading of the coupling element 36 can be avoided.

Figure 7:
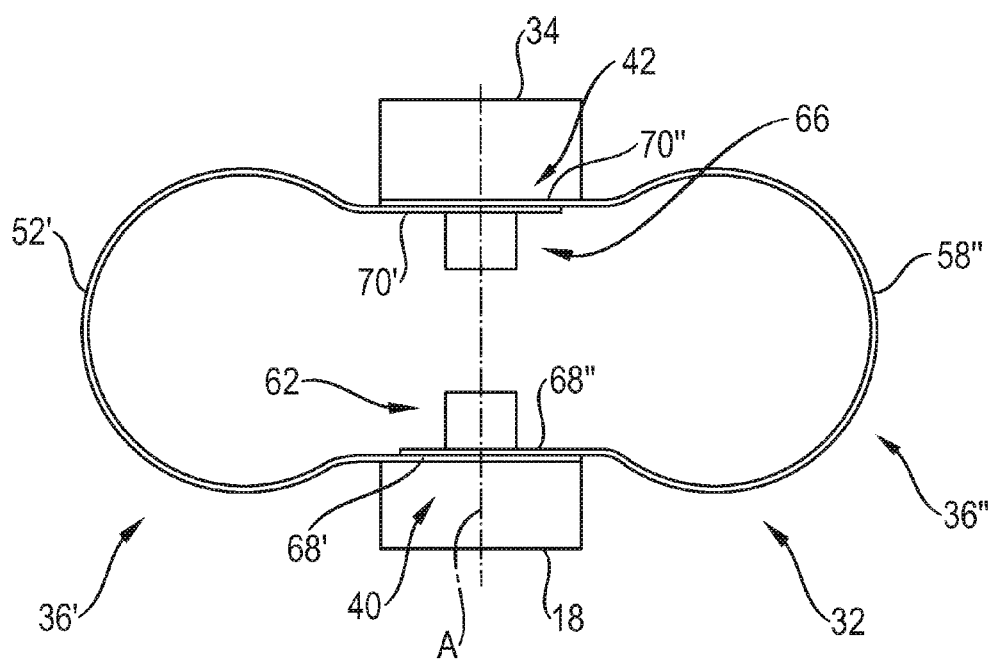
FIG. 7 is a lateral view showing an alternative type of embodiment.

Another modified embodiment of the coupling device is shown in FIG. 7. In the embodiment according to FIG. 7, the coupling device 32 has two coupling elements 36', 36". Each of the two coupling elements 36', 36" has, for example, again the Ω-shaped structure already mentioned above. The first coupling area 40 comprises two first end areas 68', 68" of the two coupling elements 36' and 36", which end areas 68', 68" are arranged overlapping one another. The second coupling area 42 comprises two second end areas 70', 70" of the two coupling elements 36', 36", which end areas 70', 70" are arranged overlapping one another. Here, the two coupling elements 36', 36" extend with their two connection areas 52', 58" in opposite directions to one another relative to the pivot axis A. In the two coupling areas 40, 42, the two end areas 68', 68" or 70', 70", which are each arranged overlapping one another, can be permanently connected to one another, for example, by welding for providing a permanently mounted assembly unit.

For coupling to the drive element 34 or to the pivot shaft 18, the two coupling areas 40, 42 may be configured as described with reference to the above-described embodiments and as shown, for example, in FIGS. 3 and 5.

Thus, as in the above-described embodiments as well, a loading of the pivot shaft 18 in a direction away from the flap drive 12, which loading is uniform in the axial direction and avoids a tilting, is obtained in the embodiment of the coupling device 32 shown in FIG. 7 with two coupling elements 36', 36", wherein, here as well, because of the Ω-shaped configuration of the two coupling elements 36', 36" or of the two connection areas 52', 58" from sheet material with a comparatively high temperature lag, the coupling device 32 provides a large surface for the dissipation of heat to the outside.

Figure 8:
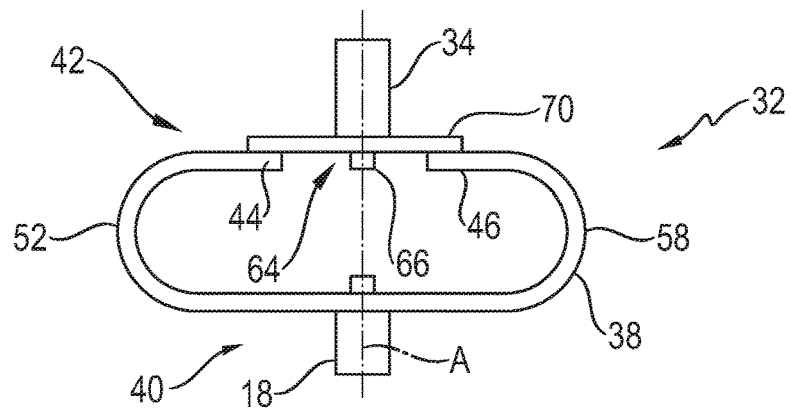
FIG. 8 is a lateral view showing an alternative type of embodiment of the coupling device between the drive element and a pivot shaft.

Another alternative type of embodiment of a coupling device 32 is shown in FIG. 8. In this embodiment, the two end areas 44, 46 of the piece of sheet material 38 do not overlap in the second coupling area 42. Instead, each of the end areas 44, 46 is connected to a connecting part 70, which is likewise strip-like or is provided as a piece of sheet material. Each of the end areas 44, 46 is permanently connected to the connecting part 70, preferably overlapping with it, for example, by welding, riveting, screwing or in another way, in order to provide a closed, ring-like configuration of the coupling device 32. The second positive-locking coupling formation 64 is provided in the connecting part 70.

Such an embodiment of the coupling area or, insofar as the embodiment according to FIG. 7 is concerned, also optionally of both coupling areas, may, of course, be provided in the embodiments shown in FIGS. 1-7 as well. Further, it can be seen in FIG. 8 that the two connection areas 52, 58 there have an essentially U-shaped configuration. This could also be provided in one or both connection areas of the above-described embodiments.

FIG. 9a through 9d, with reference to the first opposite positive-locking coupling formation 62 of the pivot shaft 18, show various examples of the configuration of the opposite positive-locking coupling formations 66, 62, which are provided at the drive element 34 and the pivot shaft 18, respectively, which may, of course, also be used in all of the above-described embodiments.

Figure 9:
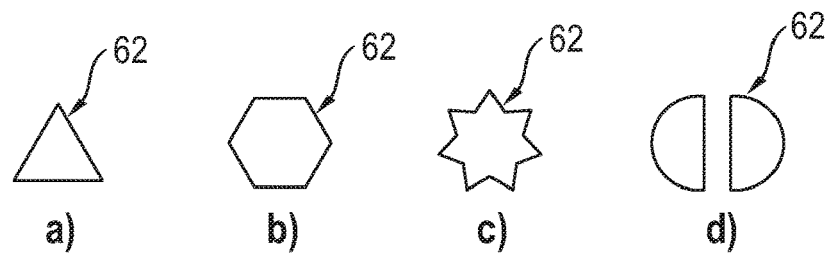
FIG. 9a is a view showing one of various examples of a configuration of the positive-locking coupling formations and the opposite positive-locking coupling formations.
FIG. 9b is a view showing another of various examples of a configuration of the positive-locking coupling formations and the opposite positive-locking coupling formations.
FIG. 9c is a view showing another of various examples of a configuration of the positive-locking coupling formations and the opposite positive-locking coupling formations.
FIG. 9d is a view showing another of various examples of a configuration of the positive-locking coupling formations and the opposite positive-locking coupling formations.

The opposite positive-locking coupling formation 62 of FIG. 9a is, in principle, configured with a polygonal outer profile in the form of a triangle. FIG. 9b also shows a polygonal outer profile, here in the form of an hexagon insert. It should be pointed out that, of course, a different number of corners or edges, for example, a quadrangular or pentagonal configuration is also possible.

FIG. 9c shows a star-shaped configuration of the opposite positive-locking coupling formation 62, which may, for example, be based on the geometry of a screw-driving tool to be used for a TORX screw head. It should be pointed out that in case of such a star-shaped configuration, the number of outwardly projecting points may be different than shown in FIG. 9c.

FIG. 9d shows a structure, which has two adjacent and axially projecting meshing areas, each with an essentially semicircular circumferential geometry and mutual spacing from one another. Especially in connection with this embodiment, it should be pointed out that the opposite positive-locking coupling formation 62 may have a different number of such projections with different geometries.

Associated with a respective opposite positive-locking coupling formation 62, 66, which is always provided due to the configuration of the axial end areas of the pivot shaft 18 or of the drive element 34 or of components to be fixed thereon and thus axially continuing same, the positive-locking coupling formations 60, 64 are complementary to the coupling areas 40, 42, i.e., configured as correspondingly shaped and dimensioned openings, which guarantee a receiving of a respective opposite positive-locking coupling formation 62, 66 essentially without play. An axial holding together of the coupling areas 40, 42 with the pivot shaft 18 and the drive element 34, respectively, can, on the one hand, be guaranteed by the coupling areas 40, 42 being axially supported at respective shoulder-like, radial projections at the pivot shaft 18 or the drive element 34. In addition, a fastening bolt, for example, a bolt or rivet, which radially overlaps a respective coupling area 40, 42, for example, in conjunction with a washer, and thus prevents a loosening of same, can be inserted into the axial end of the pivot shaft 18 or of the drive element 34 for axial fixing in the respective other direction.

Figure 10:
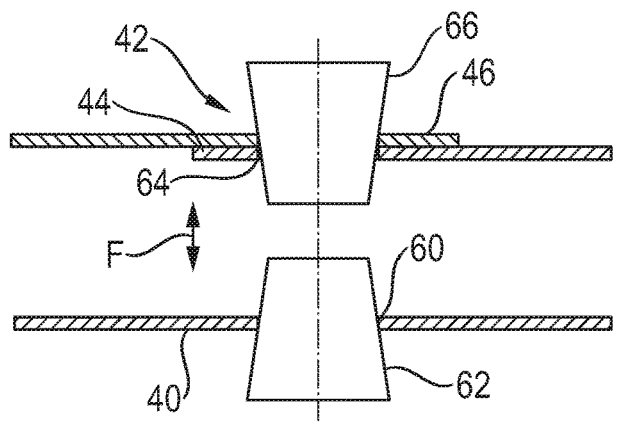
FIG. 10 is a detail sectional view showing the couplings areas of a coupling device coupled with a drive element or with a pivot shaft.

FIG. 10 shows an especially advantageous example of the embodiment of the opposite positive-locking coupling formations 62, 66. Here, the axial end areas of the pivot shaft 18 and of the drive element 34 are configured as tapering, for example, tapering conically, towards the respective other component. This can be embodied in all moldings, especially those of the opposite positive-locking coupling formations 62, 66 explained with reference to FIG. 9a through 9d.

Due to this tapering configuration of the opposite positive-locking coupling formations 62, 66 and taking into consideration the circumstance that the two coupling areas 40, 42 are prestressed in the manner explained above by a force F in a direction away from one another and thus in a direction towards the pivot shaft 18 and the drive element 34, it can be guaranteed that, on the one hand, the opposite positive-locking coupling formations 62, 66 can easily be inserted into the associated positive-locking coupling formations 60, 64, and a meshing, without play and thus generating a defined rotary coupling, is at the same time guaranteed due to the prestressing of the coupling areas 40, 42 against the pivot shaft 18 or the drive element 34 and the thereby resulting axial support at the tapering areas. It is possible to dispense with providing additional fastening elements, for example, bolts, rivets and washers, by means of which an axially fixed holding together of the respective coupling parts 36, 38 with the pivot shaft 18 and the drive element 34 can be guaranteed. The coupling device 32 is held by its own axial prestress, itself meshing with the pivot shaft 18 or the drive element 34 or centered between them.

Even though the above-described coupling of the coupling device 32 to the pivot shaft 18 or to the drive element 34 is especially advantageous because of the simple configuration and the defined rotary coupling, it should, in conclusion, be pointed out that, in principle, other types of connection, for example, screwing or riveting, preferably always with a plurality of bolts, welding, caulking or the like, may also be used for connecting the coupling device 32 to the pivot shaft 18 or/and to the drive element 34.

While specific embodiments of the invention have been shown and described in detail to illustrate the application of the principles of the invention, it will be understood that the invention may be embodied otherwise without departing from such principles.

What is claimed is:

1. A coupling device for a rotary coupling of a pivot shaft of a flap diaphragm of an exhaust gas flap with a drive element, the coupling device comprising at least one coupling element comprised of one piece of sheet material and comprising:
   a first coupling area configured for coupling to the pivot shaft, the first coupling area comprising a first coupling first end area and a first coupling second end area and a first positive-locking coupling formation between the first coupling first end area and the first coupling second end area;
   a second coupling area configured for coupling to the drive element, the second coupling area comprising a second coupling first end area and a second coupling second end area and a second positive-locking coupling formation between the second coupling first end area and the second coupling second end area; and
   connection areas connecting the first coupling area to the second coupling area, the connection areas comprising a first connection area provided adjacent to the first coupling first end area and adjacent to the second coupling first end area and the connection areas comprising a second connection area provided adjacent to the first coupling second end area and adjacent to the second coupling second end area, wherein one of the first coupling area and the second coupling area comprises end areas of the one piece of sheet material arranged overlapping one another and commonly providing the positive locking coupling formation of the one of the first coupling area and the second coupling area, and wherein, in a coupled state, the first coupling area and the second coupling area are prestressed in a direction towards one another or are prestressed in a direction away from one another.

2. A coupling device in accordance with claim 1, wherein the sheet material of the at least one coupling element sheet material comprises steel sheet or titanium sheet.

3. A coupling device in accordance with claim 1, wherein the at least one connection area has a V-shaped configuration.

4. A coupling device in accordance with claim 1, wherein the at least one connection area has an Ω-shaped configuration.

5. A coupling device in accordance with claim 1, wherein one of the end areas is located axially adjacent to another one of the end areas with respect to a longitudinal axis of the pivot shaft.

6. A coupling device in accordance with claim 1, wherein the end areas comprises a first end area and a second end area, the first end area comprising a first planar end portion, the second end area comprising a second planar end portion, the first planar end portion being in direct contact with the second planar end portion.

7. A coupling device in accordance with claim 6, wherein the first planar end portion is adjacent to the second planar end portion.

8. A coupling device in accordance with claim 6, wherein the first planar end portion is located axially adjacent to the second planar end portion with respect to a longitudinal axis of the pivot shaft.

9. An exhaust gas flap, especially for an exhaust gas stream of an internal combustion engine, the exhaust gas flap comprising:
   a flap tube;
   a pivot shaft;
   a flap diaphragm carried in the interior of the flap tube on the pivot shaft and rotatable about a pivot axis;
   a pivot drive with a drive element for driving the pivot shaft;
   a coupling device coupling the drive element with the pivot shaft for joint rotation about the pivot axis, the coupling device comprising at least one coupling element comprised of sheet material and comprising:
   a first coupling area configured for coupling to the pivot shaft;
   a second coupling area configured for coupling to the drive element; and
   at least one connection area connecting the first coupling area to the second coupling area, wherein, in a coupled state, the first coupling area and the second coupling area are prestressed in a direction towards one another or are prestressed in a direction away from one another, wherein:
   the coupling element is formed from one piece of sheet material;
   at least one of the first coupling area and the second coupling area comprises end areas of the piece of sheet material arranged overlapping one another;
   a first opposite positive-locking coupling formation is provided on the pivot shaft;
   a first positive-locking coupling formation, meshing in a coupling manner with the first opposite positive-locking coupling formation, is provided at the first coupling area of the coupling device;
   a second opposite positive-locking coupling formation is provided at the drive element; and
   a second positive-locking coupling formation meshing in a coupling manner with the second opposite positive-locking coupling formation is provided at the second coupling area of the coupling device.

10. An exhaust gas flap in accordance with claim 9, wherein at least one of the positive-locking coupling formations or the opposite positive-locking coupling formations has a polygonal outer profile and the opposite positive-locking coupling formation or positive-locking coupling formation associated with same has a complementary polygonal inner profile.

11. An exhaust gas flap in accordance with claim 9, wherein the first coupling area is prestressed in a direction towards the pivot shaft and the second coupling area is prestressed in a direction towards the drive element, such that the pivot shaft is prestressed by the coupling device in a direction away from the drive element.

12. An exhaust gas flap in accordance with claim 9, wherein the first opposite positive-locking coupling formation is configured to be tapering in a direction towards the drive element or/and the second opposite positive-locking coupling formation is configured to be tapering in a direction towards the pivot shaft.

13. An exhaust gas flap in accordance with claim 9, wherein one of the end areas is located axially adjacent to another one of the end areas with respect to a longitudinal axis of the pivot shaft.

14. An exhaust gas flap in accordance with claim 9, wherein the end areas comprises a first end area and a second end area, the first end area comprising a first planar end portion, the second end area comprising a second planar end portion, the first planar end portion being in direct contact with the second planar end portion.

15. An exhaust gas flap in accordance with claim 14, wherein the first planar end portion is adjacent to the second planar end portion.

16. An exhaust gas flap in accordance with claim 14, wherein the first planar end portion is located axially adjacent to the second planar end portion with respect to a longitudinal axis of the pivot shaft.

17. A coupling device for a rotary coupling of a pivot shaft of a flap diaphragm of an exhaust gas flap with a drive element, the coupling device comprising:
  at least one coupling element comprising a single, one-piece sheet material, the at least one coupling element comprising:
    a first end area and a second end area;
    an outer coupling element surface extending continuously from the first end area to the second end area;
    a first coupling area configured for coupling to the pivot shaft, the first coupling area comprising a first coupling first end area and a first coupling second end area and a first positive-locking coupling formation between the first coupling first end area and the first coupling second end area;
    a second coupling area configured for coupling to the drive element, the second coupling area comprising a second coupling first end area and a second coupling second end area and a second positive-locking coupling formation between the second coupling first end area and the second coupling second end area; and
    a plurality of connection areas connecting the first coupling area to the second coupling area, the connection areas comprising a first connection area provided adjacent to the first coupling first end area and adjacent to the second coupling first end area and the connection areas comprising a second connection area provided adjacent to the first coupling second end area and adjacent to the second coupling second end area, wherein one of the first coupling area and the second coupling area comprises the first end area and the second end area arranged overlapping one another and commonly providing the positive locking coupling formation of the one of the first coupling area and the second coupling area, and wherein, in a coupled state, the first coupling area and the second coupling area are prestressed in a direction towards one another or are prestressed in a direction away from one another.

18. A coupling device in accordance with claim 17, wherein the first end area comprises a first planar end portion, the second end area comprising a second planar end portion, the first planar end portion being in direct contact with the second planar end portion, wherein the first planar end portion is adjacent to the second planar end portion, the first planar end portion being located axially adjacent to the second planar end portion with respect to a longitudinal axis of the pivot shaft.

19. A coupling device in accordance with claim 17, wherein the first end area is located axially adjacent to the second end area with respect to a longitudinal axis of the pivot shaft, wherein a portion of the outer coupling element surface is in contact with an inner surface of the at least one coupling element in a region of the first end area and the second end area.

* * * * *